(12) United States Patent
Bausch et al.

(10) Patent No.: US 10,907,705 B2
(45) Date of Patent: Feb. 2, 2021

(54) TRANSMISSION DEVICE FOR INSTALLATION ON A DRIVESHAFT

(71) Applicant: Lock Antriebstechnik GmbH, Ertingen (DE)

(72) Inventors: Manfred Bausch, Unlingen (DE); Marius Baur, Oberwachingen (DE); Daniela Vogel, Bingen (DE)

(73) Assignee: Lock Antriebstechnik GmbH, Ertingen (DE)

(\*) Notice: Subject to any disclaimer, the term of this patent is extended or adjusted under 35 U.S.C. 154(b) by 284 days.

(21) Appl. No.: 15/728,746

(22) Filed: Oct. 10, 2017

(65) Prior Publication Data

US 2018/0087630 A1   Mar. 29, 2018

Related U.S. Application Data

(63) Continuation of application No. PCT/EP2016/056087, filed on Mar. 21, 2016.

(30) Foreign Application Priority Data

Apr. 13, 2015  (DE) .................... 20 2015 101 789 U
Oct. 19, 2015  (DE) .................... 20 2015 105 507 U

(51) Int. Cl.
*F16H 19/04* (2006.01)
*F16H 55/12* (2006.01)
(Continued)

(52) U.S. Cl.
CPC ........... *F16H 19/04* (2013.01); *E05F 15/635* (2015.01); *F16H 55/12* (2013.01); *F16H 55/26* (2013.01);
(Continued)

(58) Field of Classification Search
CPC ....... F16H 55/12; F16H 19/04; F16H 57/0025
See application file for complete search history.

(56) References Cited

U.S. PATENT DOCUMENTS

| 1,391,719 | A | 12/1921 | Conyngham |
| 4,130,024 | A | 12/1978 | Hayasaka et al. |

(Continued)

FOREIGN PATENT DOCUMENTS

| DE | 2 160 280 A | 11/1972 |
| DE | 27 29 234 A1 | 1/1978 |

(Continued)

OTHER PUBLICATIONS

English translation of International Preliminary Report on Patentability (Chapter I) (Application No. PCT/EP2016/056087) dated Oct. 17, 2017, 5 pages.

(Continued)

*Primary Examiner* — William Kelleher
*Assistant Examiner* — Gregory T Prather
(74) *Attorney, Agent, or Firm* — Burr & Brown, PLLC

(57) ABSTRACT

A transmission device for installation on a driveshaft, having a base body which encloses the driveshaft, a pinion which in the mounted state is arranged in the base body and on the driveshaft, and a rack which interacts with the pinion and runs through the base body. The transmission device is distinguished by the fact that the base body is open on one side in such a way that it can be fitted onto a driveshaft in the radial direction, and in that the pinion is in multiple parts such that it is possible to perform a mounting process on the driveshaft during which the parts of the pinion can be joined together by a radial movement with respect to the driveshaft.

8 Claims, 11 Drawing Sheets

(51) Int. Cl.
  *F16H 55/26* (2006.01)
  *E05F 15/635* (2015.01)
  *F16H 57/023* (2012.01)
  *F16H 57/00* (2012.01)
  *E05F 15/619* (2015.01)

(52) U.S. Cl.
  CPC ....... *F16H 57/0025* (2013.01); *F16H 57/023* (2013.01); *E05F 15/619* (2015.01); *E05Y 2201/716* (2013.01); *E05Y 2201/722* (2013.01); *E05Y 2800/70* (2013.01)

(56) References Cited

U.S. PATENT DOCUMENTS

| | | | | |
|---|---|---|---|---|
| 4,964,842 | A | | 10/1990 | Howard |
| 5,037,356 | A | * | 8/1991 | Gladczak ................ F16H 55/12 |
| | | | | 474/902 |
| 5,702,316 | A | * | 12/1997 | Cole ........................ F16H 55/12 |
| | | | | 474/95 |
| 6,758,776 | B2 | * | 7/2004 | Fye ......................... F16H 55/30 |
| | | | | 474/95 |
| 2006/0060015 | A1 | | 3/2006 | Hofschulte et al. |
| 2011/0209535 | A1 | | 9/2011 | Sun |
| 2012/0279329 | A1 | | 11/2012 | Veasey et al. |
| 2014/0305241 | A1 | * | 10/2014 | Li ............................ F16H 55/12 |
| | | | | 74/448 |
| 2018/0112749 | A1 | * | 4/2018 | Bausch ................... F16H 55/26 |
| 2018/0283521 | A1 | * | 10/2018 | Wu ......................... F16H 55/12 |

FOREIGN PATENT DOCUMENTS

| | | |
|---|---|---|
| DE | 10 2004 063 932 A1 | 4/2006 |
| EP | 0 121 062 B1 | 4/1986 |
| EP | 0 881 409 A1 | 12/1998 |
| FR | 1 268 778 A | 8/1961 |
| FR | 2 927 138 A1 | 8/2009 |
| WO | 95/06184 A1 | 3/1995 |
| WO | 00/47916 A1 | 8/2000 |

OTHER PUBLICATIONS

German Search Report (Application No. 20 2015 105 507.2) dated Feb. 23, 2016.
International Search Report and Written Opinion (Application No. PCT/EP2016/056087) dated Jun. 27, 2016.

* cited by examiner

TRANSMISSION DEVICE FOR INSTALLATION ON A DRIVESHAFT

CROSS REFERENCE TO RELATED APPLICATIONS

This application is a continuation of International Application No. PCT/EP2016/056087 filed Mar. 21, 2016, which designated the United States, and claims the benefit under 35 USC § 119(a)-(d) of German Application No. 20 2015 101 789.8 filed Apr. 13, 2015 and German Application No. 20 2015 105 507.2 filed Oct. 19, 2015, the entireties of which are incorporated herein by reference.

FIELD OF THE INVENTION

The present invention relates to the installation of a transmission device for installation on a driveshaft.

BACKGROUND OF THE INVENTION

Transmission devices of the type denoted in the introduction are already known in a variety of embodiments.

For example, rack and pinion gear mechanisms are used to move glass wings into different pivoting positions, in particular into a closed position and a completely opened position, in greenhouses, the glass wings being connected to one end of the rack.

An entire series of rack and pinion gear mechanisms are frequently arranged on a driveshaft in order to be able to activate therewith a multiplicity of glass wings which are each connected to one end of a respective rack of the rack and pinion gear mechanism.

SUMMARY OF THE INVENTION

The present invention is based on the object of configuring a transmission device of the type denoted in the introduction in such a way that a variety of possible uses and mounting options are provided.

The present invention is based on a transmission device for installation on a driveshaft, having a base body which encloses the driveshaft, such as a pinion which in the mounted state is arranged in the base body and on the driveshaft, and comprises a rack which interacts with the pinion and runs through the base body.

The core of the present invention lies in the fact that the base body is, particularly, in an unseparated state, open on one side, in such a way in which it is embodied in the complete form after installation on a driveshaft, such that it can be fitted in the radial direction onto a driveshaft, and that the pinion is in multiple parts such that it is possible to perform a mounting process on the driveshaft during which the parts of the pinion can be assembled by a radial movement with respect to the driveshaft.

By virtue of this measure, it is, in particular, possible to mount the transmission device according to the present invention on a driveshaft without the ends of the driveshaft having to be accessible such as is necessary with rack and pinion gear mechanisms which are known from the prior art, in which, in particular, a pinion and a housing which surrounds the pinion can be mounted only by axially fitting onto a driveshaft, over one end of the driveshaft.

In contrast, the transmission device according to the present invention can be retrofitted or mounted as a replacement for rack and pinion gear mechanisms which experience wear at virtually any desired location on a completely mounted system without preceding removal of any supporting parts, in particular of the driveshaft, being necessary, and without one end of the driveshaft having to be accessible.

In a particularly preferred refinement of the present invention, the base body comprises a bearing section for, for example, immediately supporting the driveshaft.

As a result, the design of the transmission device is simple, since, for example in the case of a sliding bearing without bearing faces, no further bearing parts are necessary.

The bearing section is preferably embodied as a sliding bearing.

For example, the bearing face comprises a plastic part which is preferably attached directly to the base body. The bearing face can, however, also be formed on the base body itself.

This is advantageous, in particular, when the base body is composed of plastic. This provides the possibility of integrating a sliding bearing made of plastic directly in the base body, in particular of forming it integrally therefrom.

In a further particularly preferred refinement of the present invention, the base body is composed of a bent sheet-metal part.

This measure permits the base body to be manufactured with little deployment of material.

For example one or more bearing inserts, in particular plastic inserts, can be mounted in the bent sheet-metal part, at bearing points of a driveshaft which rotates therein.

The base body preferably comprises two bearing limbs in which in the mounted state a driveshaft lies in a fitting rounded portion. The locations at which the driveshaft is in contact with the limbs are preferably covered with an, in particular, U-shaped plastic part which, on the one hand, makes available a sliding bearing surface and, on the other hand, can be secured easily to the respective, in particular plate-shaped, limb of the base body by virtue of the U-shaped configuration.

In a particularly preferred refinement of the present invention, the pinion is embodied in two parts from two pinion halves. As a result, the pinion can be mounted on the driveshaft at any location thereon by joining together the pinion halves, without the pinion having to be plugged on axially.

In a further preferred refinement of the present invention, a sliding bar is provided for the rack. Therefore, a defined sliding face for a rear side, i.e. a side of the rack lying opposite the toothing arrangement, is made possible.

In order to implement a defined positioning of the sliding bar with respect to the base body, it is also proposed that the sliding bar be shaped in such a way that a stop is provided for the base body, which stop prevents the bar from sliding in a longitudinal direction with respect to the rack. For example, cutouts in which limb sections of the base body run in an inserted fashion are provided on the sliding bar.

In another advantageous embodiment of the present invention the base body comprises two limbs which in the mounted state protrude over the driveshaft and on which a sliding bar for the rack is supported. In particular, the limbs are connected to one another by means of webs, on a side lying opposite a driveshaft, in the direction of a driveshaft, such that in each case a clip which is oriented transversely with respect to a driveshaft and in which not only the rack but also the sliding bar can be placed is produced on each of the sides lying opposite one another. Cutouts are preferably provided in the sliding bar in order to accommodate therein limbs which are connected to one another by means of webs, in order to secure the sliding bar against shifting in the direction of the rack.

Furthermore, it is advantageous if limbs of the base body are configured in such a way that in each case limb sections of a limb which lie opposite one another when considered in the direction of the rack, support one another via the sliding bar.

For this purpose, the respective limb sections of a limb enclose, in particular while each being connected by means of a web, for example the sliding bar at the cutouts of the sliding bar, such that the webs are preferably let into the cutouts. By virtue of this measure, in the mounted state, when the rack is inserted and engages in a pinion which is mounted on a driveshaft, the base body rests with its back on the sliding rail and is located between the limbs of the base body, reinforced by means of the parts which are supported by one another.

Moreover, it is advantageous that the pinion is configured in such a way that the parts of the pinion can be fitted onto the driveshaft, and joined together, in particular pushed, on the driveshaft, in a first radial movement with respect to the driveshaft and in a preferably concluding axial movement with respect to the driveshaft. This measure facilitates mounting of the pinion on the driveshaft and advantageously reduces the fabrication costs and mounting costs of the pinion. This is because the axial-pushing together process permits, on the one hand, a pre-secured pinion unit to be produced which already remains automatically positioned on a driveshaft. As a result, screw means for the definitive securing and positioning can easily be used. On the other hand, it is possible to achieve a saving in terms of screw means.

In one advantageous refinement of the parts of the pinion, the ends of the parts of the pinion are embodied in an overlapping fashion in the assembled state. As a result comparatively simple joining-together, advantageously plugging-together and/or pushing-together of the pinion in the axial direction is possible.

It is also proposed that the ends of the parts of the pinion, in particular at the overlapping locations, have a toothing arrangement. As a result, the mounting of the pinion parts can be carried out by simple plugging-together, in particular without screwing, bonding and/or riveting.

The shaping of the pinions, in particular of the overlapping locations, is preferably such that the parts snap in with respect to one another when they are axially plugged together.

The toothing arrangement is preferably embodied in such a way that a non-positively locking, in particular frictionally locking connection of the pinion to the driveshaft is made by plugging together the pinion parts on the driveshaft. This prevents the pinion from twisting on the driveshaft.

BRIEF DESCRIPTION OF THE DRAWINGS

An exemplary embodiment of the present invention is illustrated in the drawings and will be explained in more detail below with the specification of further advantages and details.

DETAILED DESCRIPTION OF THE INVENTION

Figure 1:
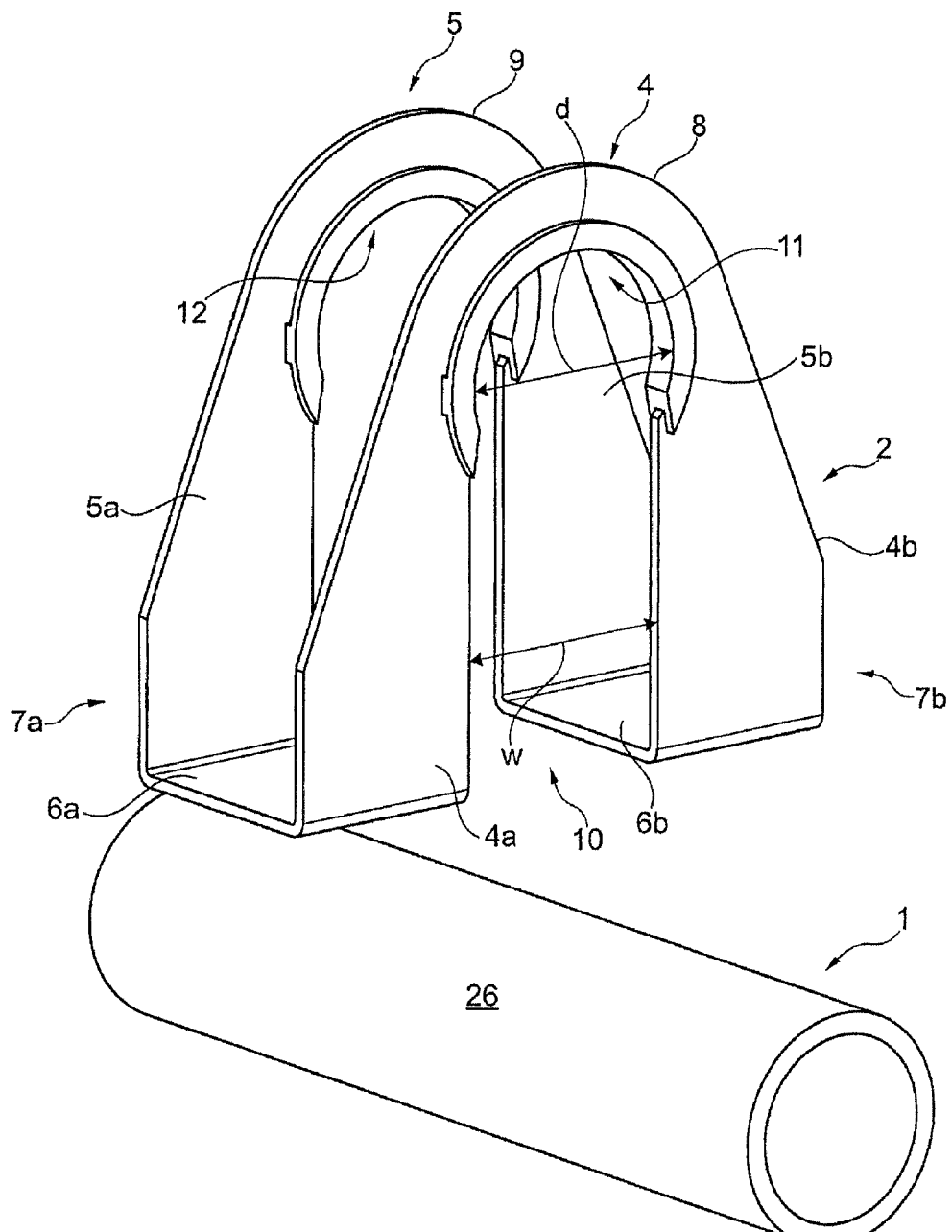
FIGS. 1 to 6 and 10, 11 show, each in a perspective view and each in different mounting states (with the exception of FIGS. 2 and 3 where merely different perspectives are illustrated), the mounting of a rack and pinion gear mechanism according to the invention on a driveshaft up to a completely mounted state of the rack and pinion gear mechanism (see FIGS. 6 and 11).
Figure 6:
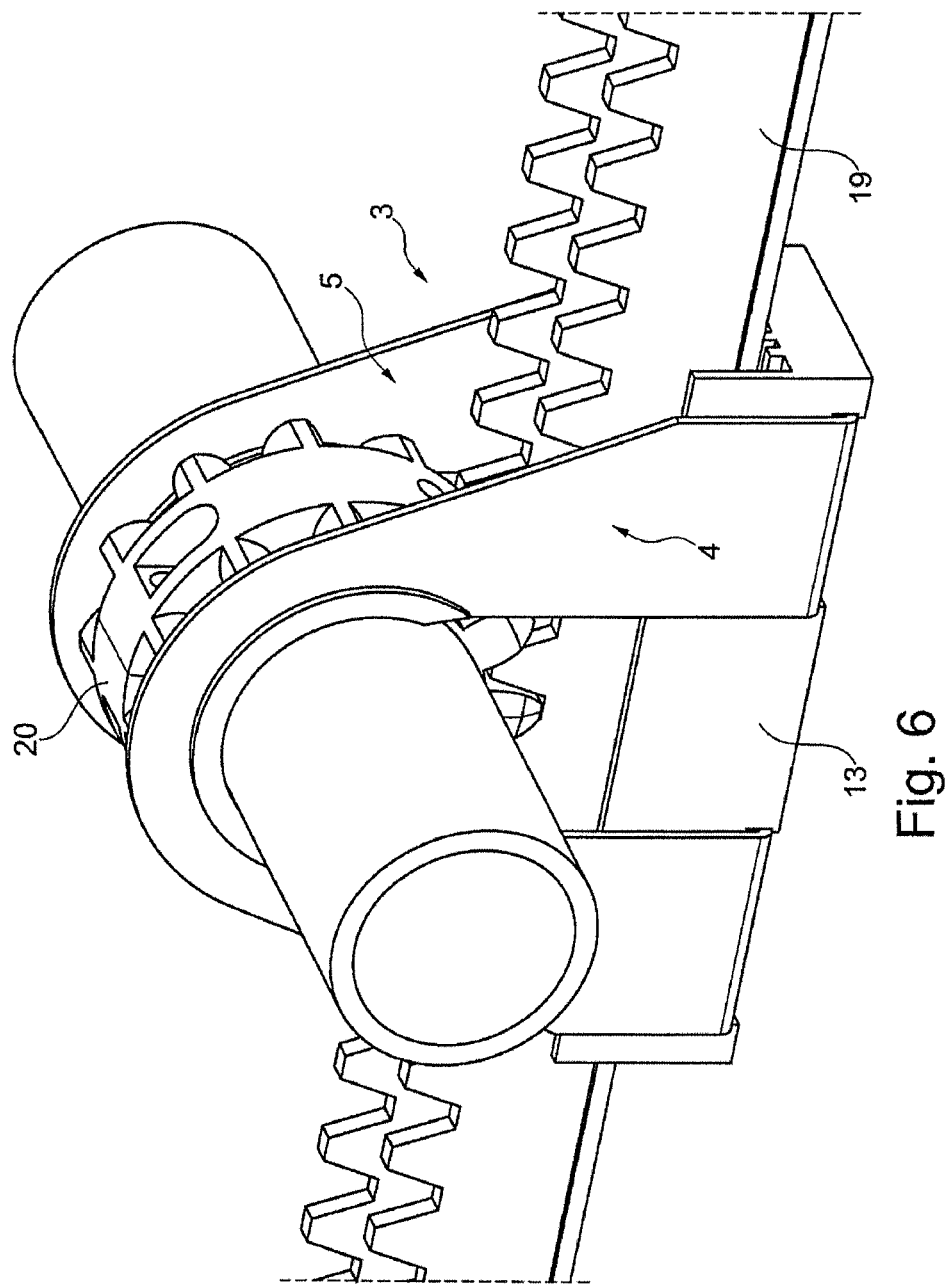

FIG. 1 illustrates a section of a driveshaft 1 and a base body or housing 2 of a complete rack and pinion gear mechanism 3 (see FIG. 6). The housing 2 comprises two limbs 4, 5 which each have limb sections 4a and 4b or limb sections 5a and 5b lying opposite one another.

In each case two limb sections 4a and 5a or 4b and 5b are connected to one another via a connecting web 6a or 6b. In this way, the limb sections 4a, 5a respectively form a U-shaped loop 7a or 7b of the housing 2 with the connecting web 6a, and the limb sections 4b, 5b respectively form a U-shaped loop 7a or 7b of the housing 2 with the connecting web 6b. Moreover, the loops 7a, 7b are arranged lying opposite one another, via connecting arches 8, 9 of the limbs 4, 5, in such a way that an opening 10 is produced which has an opening width w which at least approximately corresponds to a circular diameter d of a respective bearing opening 11, 12 in the respective connecting arch 8, 9, preferably being equally large or somewhat larger.

This makes it possible for the housing 2 to be fitted, with the opening width w, radially over the shaft 1 until the bearing shaft 1 rests completely in the bearing cutouts 11, 12 and a bearing face (not illustrated) which is formed there.

Figure 2:
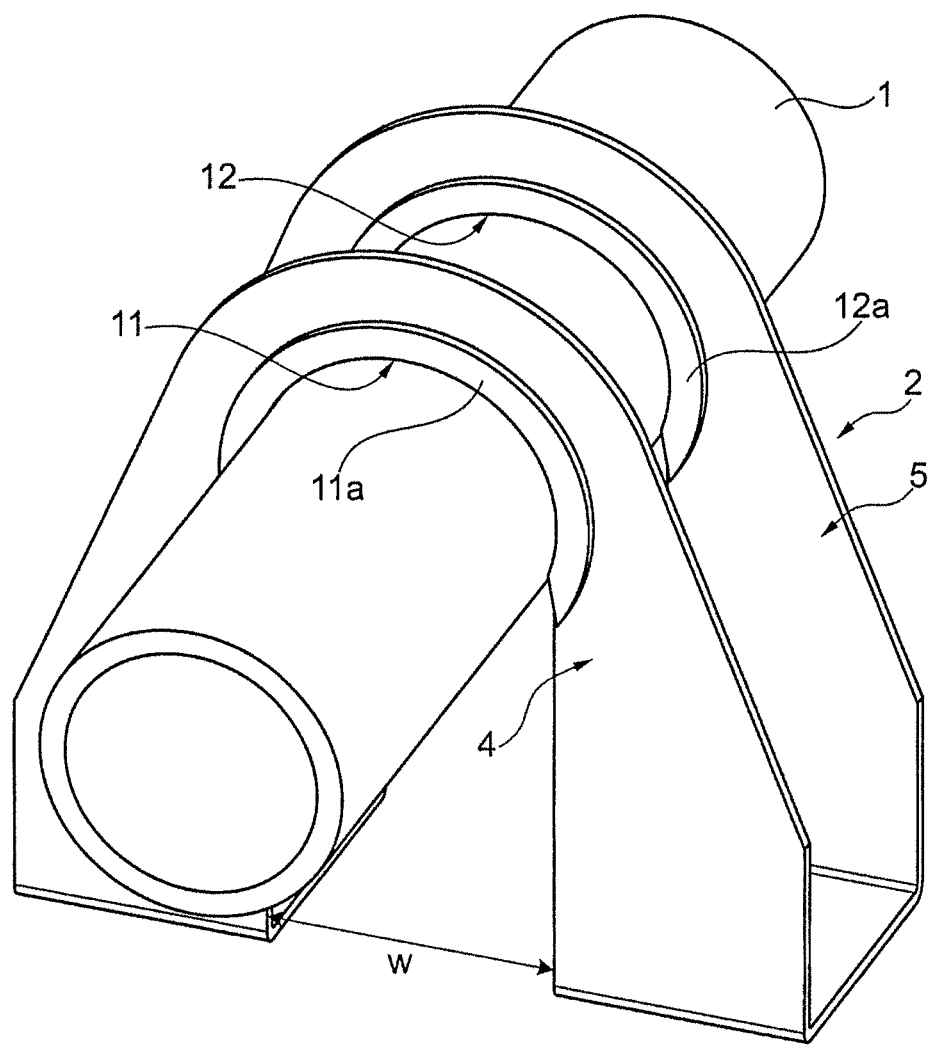
Figure 3:
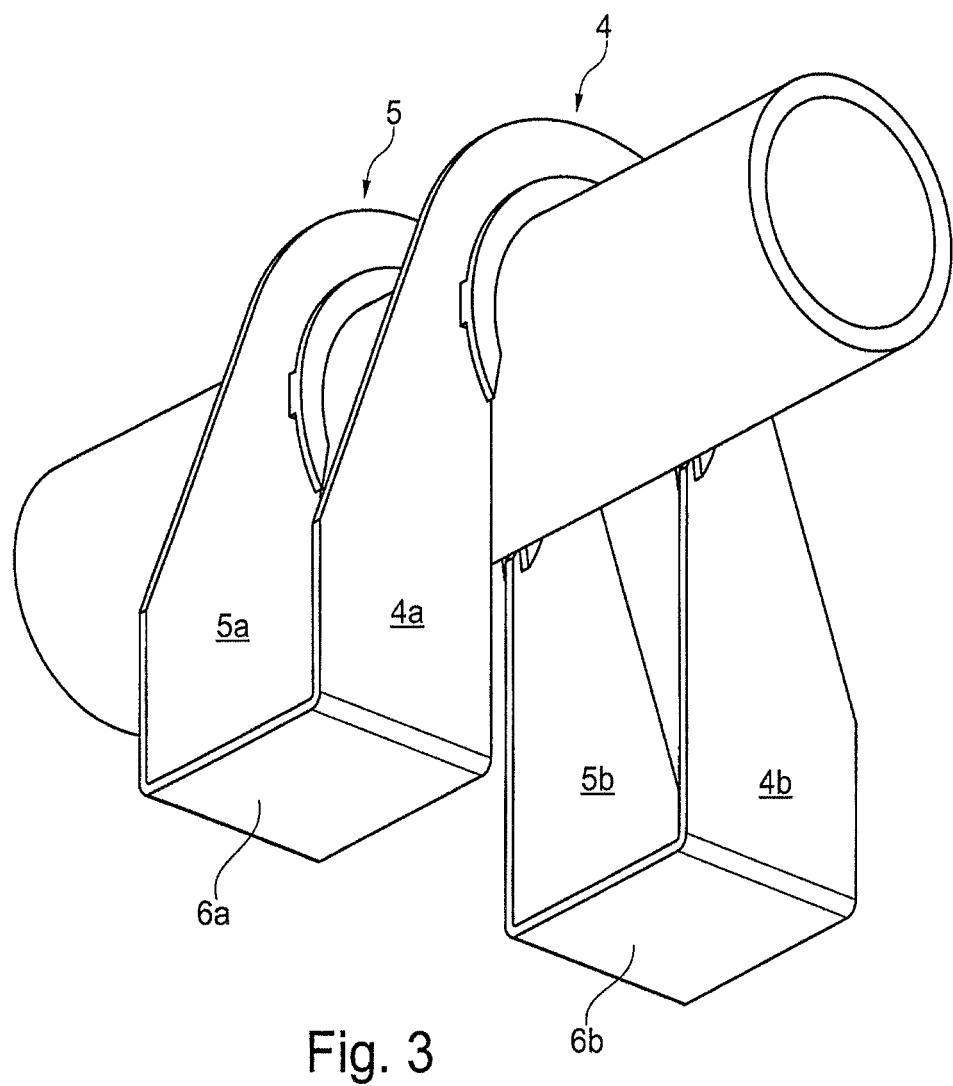

In FIG. 3, once more a different perspective of this state is illustrated with respect to FIG. 2, in which perspective, in particular, the connecting webs 6a, 6b of the limb sections 4a, 5a or 4b, 5b of the limbs 4, 5 are clearly apparent.

Figure 4:
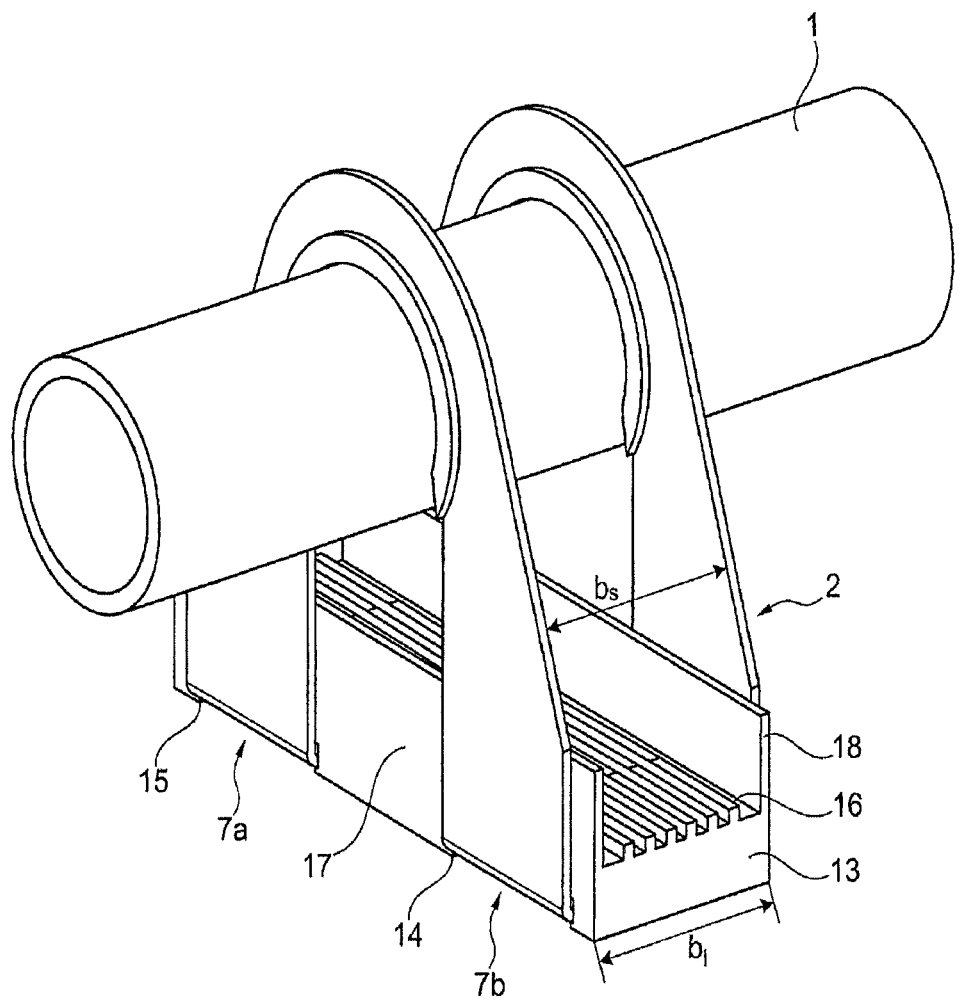

The respective loop 7a, 7b serves to receive a sliding bar 13 (see FIG. 4) which is inserted into the loops 7a, 7b. For this purpose, a cutout 14, 15 is provided in each case on a side of the sliding bar lying opposite the connecting webs 6a, 6b, the respective connecting webs 6a, 6b being received in said cutout 14, 15. As a result, shifting of the sliding bar 13 in its longitudinal direction is prevented. The sliding bar 13 preferably has a width $b_1$ which corresponds to a width $b_s$, of the loops 7a, 7b, such that the sliding bar 13 also acts as a reinforcement element of the housing 2.

Sliding fins 16 of the sliding bar 13 and boundary walls 17, 18 serve to guide a rack 19 arranged therein (see FIG. 6).

Figure 5:
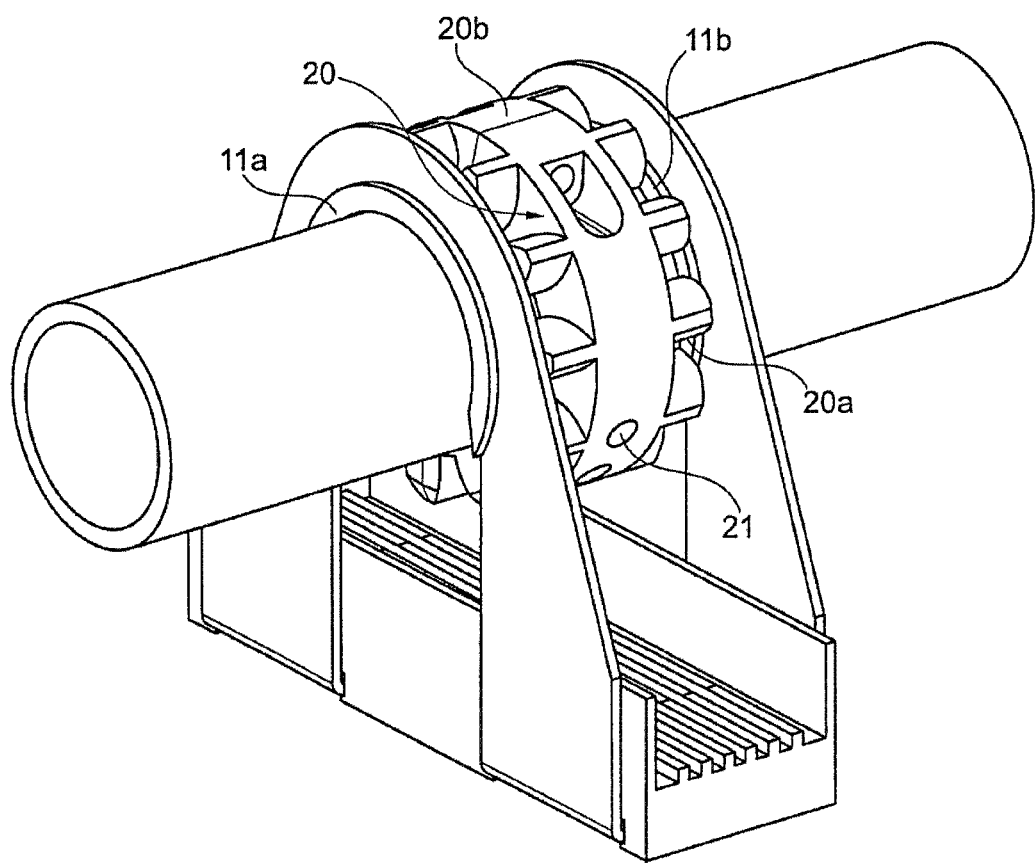

Before a rack 19 is pushed in, during mounting on a driveshaft 1, a rack pinion 20 is mounted (see FIG. 5) which according to the present invention is in multiple parts, in particular is composed of two pinion halves 20a, 20b, which are, for example, screwed to one another. The pinion 20 is secured, for example, by means of securing screws (not illustrated) in holes 21 on the shaft 1 to prevent twisting.

The bearing cutouts 11, 12 are each formed, for example, as illustrated in the figures, by means of a bearing insert 11a, 11b which is made of plastic and is plugged onto the respective limb 4, 5, which bearing inserts 11a, 11b engage around the respective limb over a predefined wall section.

However, it is also conceivable for the bearing face to be already integrated into the housing, in particular, when the housing is composed of a material such as plastic which has comparatively good sliding properties.

Figure 11:
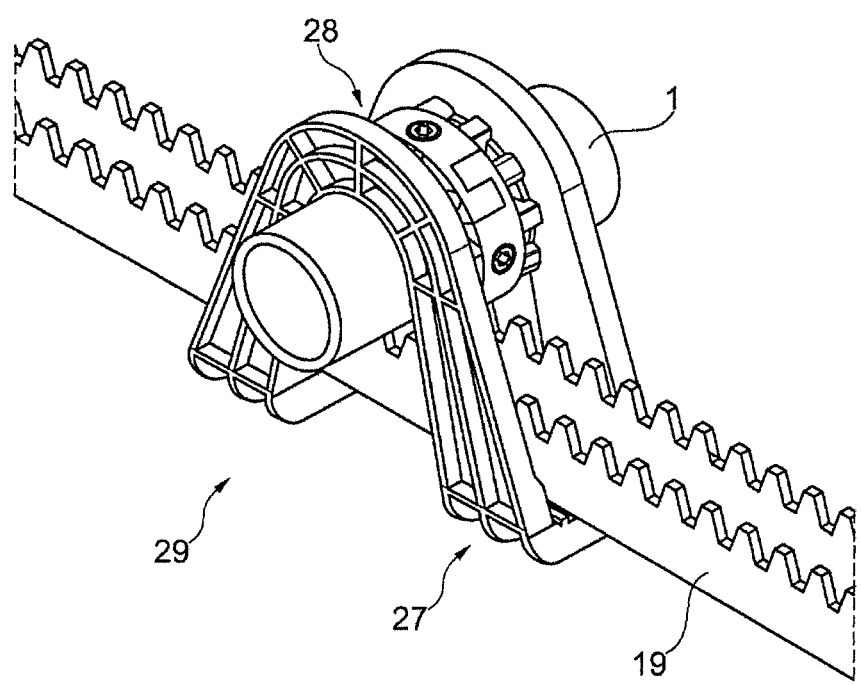

FIGS. 6 and 11 show the completely mounted state of the rack and pinion gear mechanism 3 and 29 with the rack 19 which meshes with the pinion 20 or 28 and is guided with its rear side onto the sliding fins 16 and 30a, 30b and with its lateral edges onto the boundary walls 17, 18.

The dimensions of the parts are selected, in particular, such that the rack is guided tautly between the pinion 20 and the sliding bar 13, such that the limbs 4, 5 are as a result reinforced with respect to one another and in particular a rack and pinion gear mechanism 3 which is arranged in a stable fashion is produced. As a result of the pushed-in, mounted rack 19, in particular the housing 2 can no longer be lifted off from the driveshaft 1 in the radial direction. Moreover, when the rack 19 is pushed in, the sliding bar 13 is secured against dropping out or being taken out.

Figure 7:
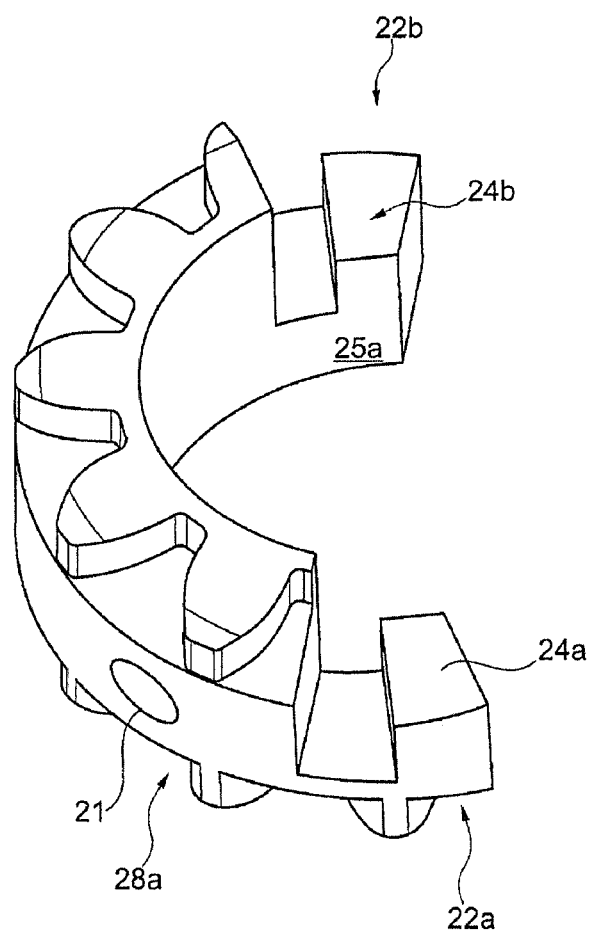
FIGS. 7 to 9 show, each in a perspective view and each in different mounting states, a pinion according to the present invention, wherein a part of a pinion is illustrated in FIG. 7.

FIG. 7 illustrates a variant of a pinion 28 with pinion halves 28a, 28b which have a toothing structure 24a or 24b at their ends 22a, 22b.

The toothing structures are advantageously configured at least in a slightly V shape. These toothing structures can be embodied in a V shape in cross section, parallel to a rotational axis A of the pinion 28, when viewed in the radial direction of the pinion 28. In the mounted state the pinion halves 28a, 28b are latched on the driveshaft 1 in such a way that release of the pinion halves 28a, 28b, in particular in the axial direction, is made difficult or even prevented.

The ends 22a, 22b are preferably configured in such a way that the mounting of the pinion halves 28a, 28b generates a radial force of the pinion halves 28a, 28b in the direction of the driveshaft 1, such that the pinion halves 28a, 28b are held by their bearing faces 25a, 25b on the driveshaft 1 in a frictionally locking and/or non-positively locking fashion.

The mounting of the pinion halves 28a, 28b on the driveshaft 1 is carried out essentially in two steps.

Figure 8:
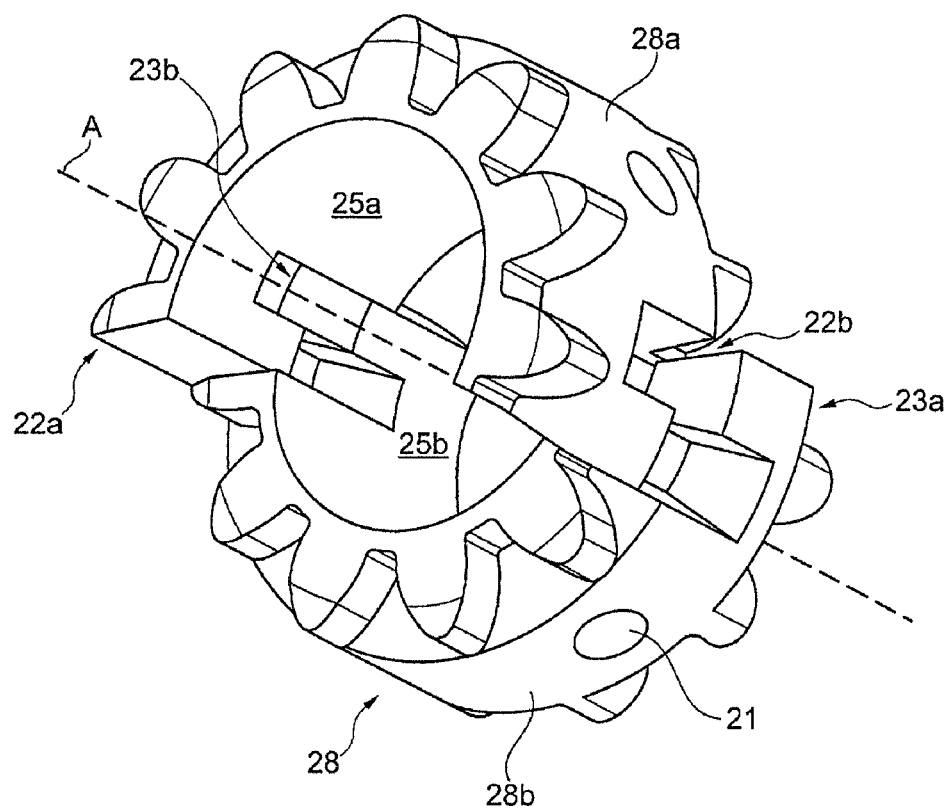

In a first step, the pinion halves 28a, 28b are fitted with their bearing halves 25a, 25b onto a driveshaft surface 26 in a radial movement in the direction of a rotational axis A of the pinion. In this context, the two pinion halves 28a, 28b are positioned with respect to one another in such a way, that the ends 22a, 22b, 23a, 23b preferably overlap when viewed in the axial direction (see FIG. 8 in this respect). If appropriate, the end face sides of the pinion halves 28a, 28b, in particular of the pinion half ends 22a, 22b also overlap, permitting facilitated axial pushing together. For example, one tooth of the pinion half end 22a is, when viewed in the axial direction, made comparatively longer or higher than a tooth of the pinion half end 22b arranged opposite the pinion half 28a. The embodiment of the teeth of the pinion half 28b is configured in a correspondingly matching opposing fashion at the pinion half ends 23a, 23b. This realizes guidance of the pinion halves 28a, 28b with respect to one another when plugging in in the axial direction occurs.

Figure 9:
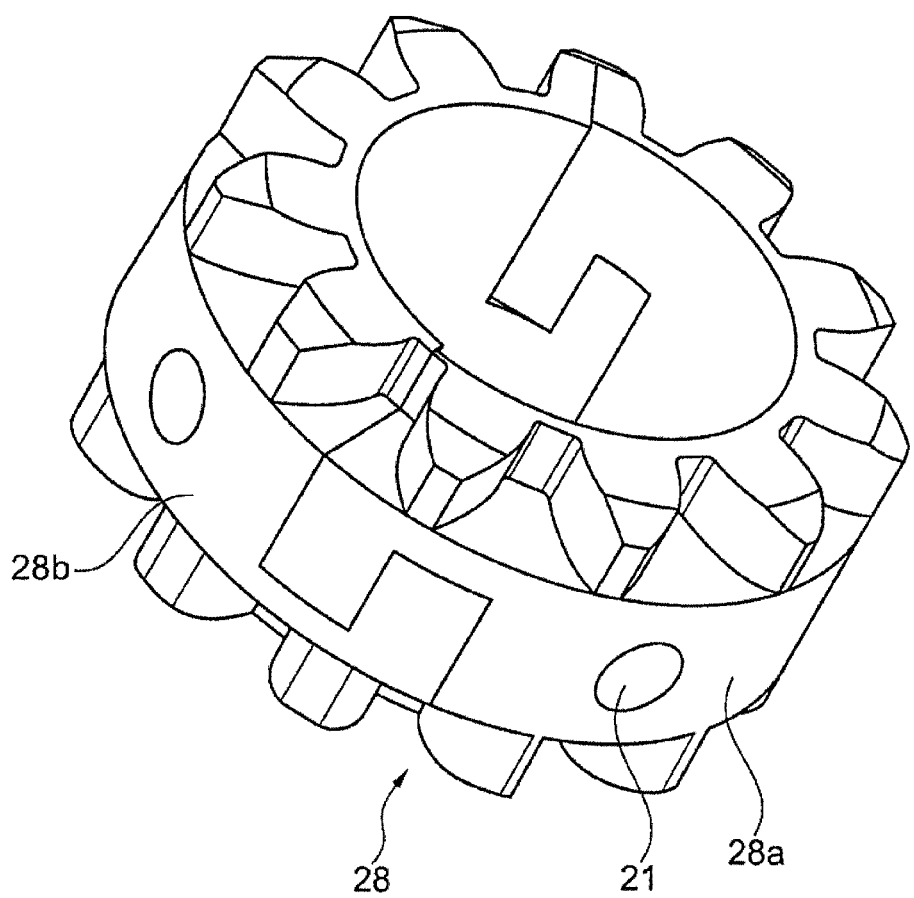

In a second further step, the pinion halves are moved toward one another in an axial movement, parallel to the rotational axis A, along the driveshaft surface 26 until the overlapping ends 22a, 22b, 23a, 23b of the pinion halves 28a, 28b engage one in the other via the toothing structures 24a, 24b, and the two pinion halves 28a, 28b are advantageously securely connected to one another. For this purpose, if appropriate a comparatively increased pressure force is to be applied by a fitter to the pinion halves 28a, 28b parallel to the rotational axis A, in order to cause the toothing structures 24a, 24b to enter into an e.g. non-positively locking connection and to position the pinion halves 28a, 28b in their mounting end position, in particular on the driveshaft 1 (FIG. 9).

Figure 10:
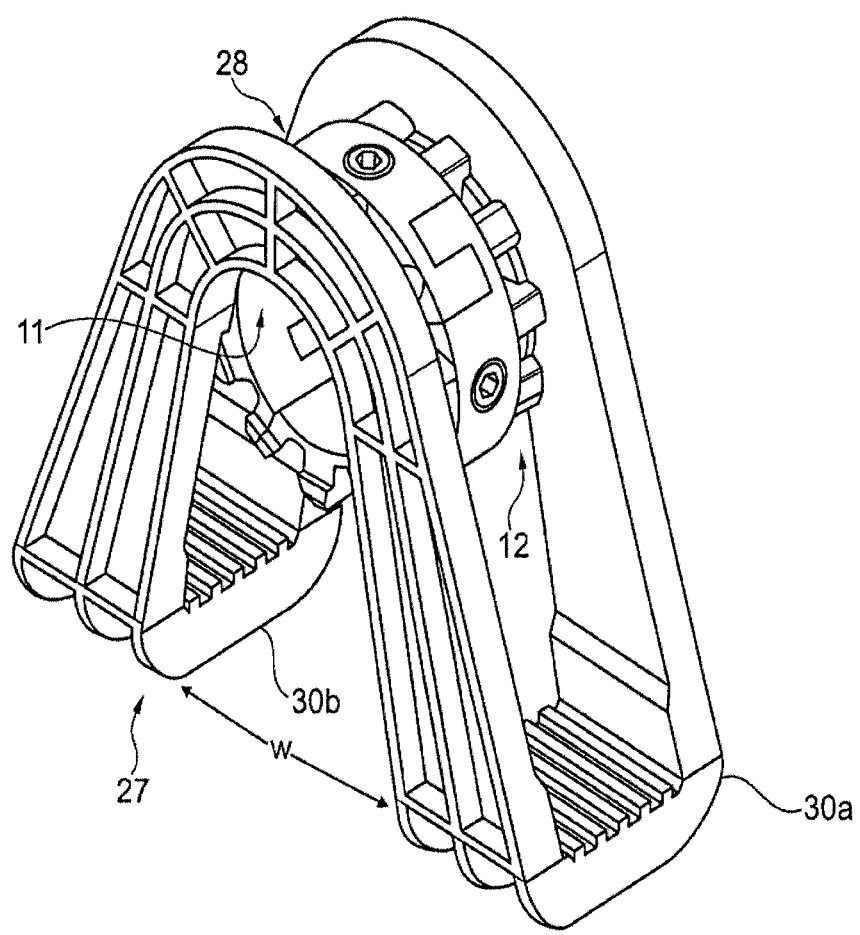

FIG. 10 illustrates a variant of a housing 27. The housing 27 is embodied in one piece with, in particular, a sliding bar which is integrated in one piece. Furthermore, the arrangement of the pinion 28 on the housing 27 is shown in the functional state without a driveshaft 1.

In the embodiment variant of the housing 27 according to FIG. 10, the opening width w is shaped between the limb sections of the housing 27 in such a way that the limb sections form two side faces of a trapezium, and the two side faces taper in the direction of bearing openings 11, 12. For example, the opening width w comprises at least the outer diameter of a pinion or is somewhat larger. This makes it possible for the housing 2 to be fitted radially, with the opening width w, over the driveshaft 1 with the pinion mounted, until the driveshaft 1 rests completely in the bearing cutouts 11, 12 and a bearing face which is formed there (FIG. 11). This advantageous embodiment of the housing 27 also permits, for example, the use of a single-part pinion (not illustrated) which is pushed to its functional position, over the driveshaft 1 from an open end of the driveshaft 1.

LIST OF REFERENCE NUMERALS

1 Driveshaft
2 Housing
3, 29 Rack and pinion gear mechanism
4 Limb
4a-b Limb section
5 Limb
5a-b Limb section
6a-b Connecting web
7a-b Loop
8-9 Connecting arch
10 Opening
11 Bearing cutout
11a Bearing insert
12 Bearing cutout
12a Bearing insert
13 Sliding bar
14-15 Cutout
16 Sliding fin
17-18 Boundary wall
19 Rack
20 Pinion
20a-b Pinion half
21 Hole
22a-b Pinion half end
23a-b Pinion half end
24a-b Toothing arrangement
25a-b Bearing face
26 Driveshaft surface
27 Housing
28 Pinion
28a-b Pinion half
30a-b Sliding Fin

The invention claimed is:

1. A transmission device for installation on a driveshaft defining an axis, having a base body which encloses the driveshaft, a pinion which in the mounted state is arranged in the base body and on the driveshaft, and a rack which interacts with the pinion and runs through the base body, wherein the base body is open on one side in such a way that it can be fitted onto the driveshaft in the radial direction, and wherein the pinion includes a first semi-annular pinion part having a first inner concave surface defining a first bearing half, a first face, at least a first tooth projecting from the first face in a first axial direction, and at least a first receptacle defined in the first face, and a second semi-annular pinion part having a second inner concave surface defining a second bearing half, a second face opposing the first face, at least a second tooth projecting from the second face in a second axial direction opposite the first axial direction, and at least a second receptacle, whereby the first and second pinion parts are configured to be assembled and joined together on the driveshaft in a first radial movement transverse to the axis defined by the driveshaft, and in a second axial movement substantially parallel to the axis defined by the driveshaft, with at least the first tooth inserted in at least the second receptacle and at least the second tooth inserted in at least the first receptacle, and the first and second bearing halves meeting to define an annular bearing section around the driveshaft.

2. The transmission device as claimed in claim 1, wherein the bearing section is a sliding bearing.

3. The transmission device as claimed in claim 1, wherein the base body is composed of plastic.

4. The transmission device as claimed in claim 1, wherein the base body is a bent sheet-metal part.

5. The transmission device as claimed in claim 1, further comprising a sliding bar for the rack.

6. The transmission device as claimed in claim 5, wherein the sliding bar is shaped in such a way that a stop is provided for the base body, the stop preventing the bar from sliding in a longitudinal direction with respect to the rack.

7. The transmission device as claimed in claim 1, wherein the base body comprises two limbs which in the mounted state protrude over the driveshaft and on which a sliding bar for the rack is supported.

8. The transmission device as claimed in claim 7, wherein each of the limbs is defined by connected first and second limb sections, each of the limb sections having an upper end and a lower end and supporting the sliding bar on generally u-shaped loop portions defined by the connected first and second limb sections.

* * * * *